US012615595B2

(12) United States Patent
Quantrill

(10) Patent No.: US 12,615,595 B2
(45) Date of Patent: Apr. 28, 2026

(54) COMMUNICATION DEVICE AND OPERATING METHOD

(71) Applicant: TRASNA TECHNOLOGIES HOLDING LIMITED, Abu Dhabi (AE)

(72) Inventor: Adam Quantrill, Thalwil (CH)

(73) Assignee: TRASNA TECHNOLOGIES HOLDING LIMITED, Abu Dhabi (AE)

( * ) Notice: Subject to any disclaimer, the term of this patent is extended or adjusted under 35 U.S.C. 154(b) by 419 days.

(21) Appl. No.: 18/332,901

(22) Filed: Jun. 12, 2023

(65) Prior Publication Data

US 2023/0422177 A1 Dec. 28, 2023

(30) Foreign Application Priority Data

Jun. 27, 2022 (EP) .................................... 22181131

(51) Int. Cl.
*H04W 52/02* (2009.01)
(52) U.S. Cl.
CPC ............................... *H04W 52/0274* (2013.01)
(58) Field of Classification Search
CPC .......... H04W 52/0274; H04W 52/0229; Y02D 30/70; G06F 1/3243; G06F 1/3275; G06F 9/4418; H04L 12/12
See application file for complete search history.

(56) References Cited

U.S. PATENT DOCUMENTS 9,826,570 B1 * 11/2017 Gupta ................. H04L 65/1073
10,420,022 B1 * 9/2019 Govindassamy ........................... H04W 52/0203

(Continued)

FOREIGN PATENT DOCUMENTS

EP 2267577 9/2017
EP 3809786 4/2021
WO WO-2017065558 A1 * 4/2017 .............. H04W 4/38

OTHER PUBLICATIONS

Extended European Search Report in European Appln. No. 22181131. 8, dated Jan. 9, 2023, 4 pages.

(Continued)

*Primary Examiner* — Jay P Patel
(74) *Attorney, Agent, or Firm* — Fish & Richardson P.C.

(57) ABSTRACT

A communication device includes a processing unit (PROC), a volatile memory (VMEM), a non-volatile storage medium (NMEM) having stored thereon a first set of instructions and a second set of instructions, and a communication unit (COMM) being coupled to the processing unit (PROC). During a transition from a standby mode of operation to an idle mode of operation, the first set of instructions is loaded into the volatile memory (VMEM) enabling the processing unit (PROC) to execute the loaded first set of instructions. During a transition from the idle mode of operation to an active mode of operation, the second set of instructions is additionally loaded into the volatile memory (VMEM) enabling the processing unit (PROC) to execute instructions from the loaded first set of instructions and the loaded second set of instructions. The processing unit is configured, in the idle mode of operation (PROC), to interact with the communication unit (COMM) for detecting, using instructions from the first set of instructions, whether a triggering message is received via the communication unit (COMM), and to initiate the transition from the idle mode of operation to the active mode of operation in response to the detection of the triggering message.

16 Claims, 3 Drawing Sheets

(56)     References Cited

U.S. PATENT DOCUMENTS

| 2011/0264854 | A1* | 10/2011 | Ouchi | G06F 3/0689 |
| | | | | 711/E12.001 |
| 2018/0114417 | A1* | 4/2018 | Kerber | H04M 1/724631 |
| 2018/0316376 | A1* | 11/2018 | Kim | H04W 4/38 |
| 2019/0129630 | A1* | 5/2019 | Erez | G06F 3/0688 |
| 2019/0129636 | A1* | 5/2019 | Benisty | G06F 3/0673 |
| 2020/0301699 | A1* | 9/2020 | Raisch | H04L 69/161 |
| 2025/0267562 | A1* | 8/2025 | Ljung | H04W 52/0216 |

OTHER PUBLICATIONS

Wikipedia.org [Online]. "Sleep Mode", Updated on Mar. 5, 2022, [Retrieved on Nov. 18, 2022], retrieved from: URL<https://en.wikipedia.org/w/index.php?title=Sleep_mode&oldid=1075454380>, 5 pages.

* cited by examiner

400 receiving code — 401 running idle scenario — 402 identifying idle portions — 403 assigning first set of instructions — 404 identifying active portions — 405 assigning second set of instructions — 406 identifying further active portions — 407 assigning further set of instructions — 408 storing instructions — 409

COMMUNICATION DEVICE AND OPERATING METHOD

CROSS-REFERENCE TO RELATED APPLICATIONS

This application claims priority to European Application No. 22181131.8, filed on Jun. 27, 2022, the contents of which are incorporated herein by reference in their entirety.

TECHNICAL FIELD

This disclosure relates to a communication device with a volatile memory and a non-volatile storage medium and to a method for operating such a communication device. The disclosure further relates to a computer-implemented method for generating (a computer program product with) a first set of instructions and a second set of instructions stored together on a non-volatile storage medium for usage in such a communication device.

BACKGROUND ART

Communication devices with processors regularly are implemented as modules that are run with restricted power supply, for example single-use batteries, solar power, energy harvesting or the like. So it is often desired to be able to operate with minimal power consumption to achieve a long availability.

Many communication devices operate in a "polled mode" where they wake up, power up the processor, check the network for activity, and go back to sleep. This periodic "idle" activity is a major drain on the power supply, and is often the dominant drain for infrequently-used devices such as in remote metering applications.

SUMMARY OF INVENTION

An object to be achieved is to provide an improved operating concept that allows an energy efficient operation of a communication device.

This object is achieved with the subject-matter of the independent claims. Embodiments and developments derive from the dependent claims.

The present disclosure is based on the insight that program executables contain many features that are not used by a processing unit in a particular scenario, especially "idle mode" type scenarios. Loading the instructions that are not used in such idle mode of operation therefore are recognized as a source of unnecessary power drain.

Hence the improved operating concept uses a separation of instructions into at least two set of instructions, from which a first set is first loaded into a working memory of the processing unit enabling the processing unit to execute the loaded first set of instructions in the idle mode of operation. Using instructions from the first set of instructions, the processing unit can detect whether a triggering message is received via a communication unit and can initiate a transition from the idle mode of operation to an active mode of operation in response to the detection of the triggering message. During that transition, a second set of instructions is loaded into the working memory, such that they are accessible to the processing unit. For example, if no triggering message is received and respectively detected, it can be returned to the standby mode, in particular without loading the second set of instructions. Hence processing power and energy can be saved in the latter case.

In an example implementation of a communication device according to the improved operating concept the communication device comprises a processing unit, a volatile memory, a non-volatile storage medium having stored thereon a first set of instructions and a second set of instructions, and a communication unit being coupled to the processing unit.

The communication device is configured to selectively be operated in a standby mode of operation, in an idle mode of operation and in an active mode of operation. Hence at least these three operating modes are available in the communication device, while further operating modes are not excluded. The standby mode of the communication device is for example a mode where the communication device is in a state of little or even minimum power consumption, particularly compared to the other operating modes. For example, the processing unit is halted in the standby mode such that e.g. no instructions are processed. The volatile memory is unpowered in the standby mode such that it can be regarded empty.

The processing unit may be in a waiting state during the standby mode such that a transition to the idle mode can be performed quickly. The standby mode can also include a full power-off state, where no power supply at all is provided to the communication device and its components.

The communication device is further configured, during a transition from the standby mode of operation to the idle mode of operation, to load the first set of instructions into the volatile memory, enabling the processing unit to execute the loaded first set of instructions, and, during a transition from the idle mode of operation to the active mode of operation, to additionally load the second set of instructions into the volatile memory enabling the processing unit to execute instructions from the loaded first set of instructions and the loaded second set of instructions.

The processing unit is configured, in the idle mode of operation, to interact with the communication unit for detecting, using instructions from the first of instructions, whether a triggering message is received via the communication unit, and to initiate the transition from the idle mode of operation to the active mode of operation in response to the detection of the triggering message.

For example, when a message is received or is to be received by the communication unit, the communication device enters the idle mode of operation from the standby mode of operation for evaluating the content of the message. The instructions for evaluating that message are included in the first set of instructions and enable the processing unit to decide whether the message is a triggering message or not. If the triggering message is detected, an extended set of instructions is made available to the processing unit by additionally loading the second set of instructions. For example, the second set of instructions enables the processing unit to access and/or control the components of the communication device or components coupled to the communication device like sensors or actors. For example, such access or control is not necessary if no triggering message is received respectively detected, making loading the second set of instructions dispensable. This allows to minimize the length of time active at each wake-up and hence to minimize an average idle current consumption.

The communication device may be a mobile device without direct and/or permanent connection to a power line, but may instead be powered only by batteries or various kinds of energy harvesting, or any other limited source of energy, i.e. restricted power supply.

For example, communication devices according to the improved operating concept may operate in a "polled mode" where they wake up, power up the processor, check the network for activity, and go back to sleep. However, the first set of instructions may be sufficient for checking whether there is activity on the network, and only if activity is actually sensed with the first set of instructions, the content respectively payload of the network activity is to be checked using instructions from the second set of instructions. The triggering message in this case may be the actual presence of network activity.

In various implementations the transition from the standby mode of operation to the idle mode of operation is initiated based on a schedule, e.g. a predetermined schedule. For example, the communication device further includes a timing circuit like a real-time clock (RTC) which at predetermined, e.g. regular times brings the communication device, in particular the processing unit and the volatile memory, into the idle mode of operation for detecting whether a triggering message is received. However, other events of initiating the transfer from the standby mode to the idle mode are not excluded.

In various implementations the transition from the idle mode of operation to the active mode of operation is performed using further instructions from the first set of instructions. These further instructions may include instructions used for loading the second set of instructions and/or powering up on the components of the communication device as mentioned above.

For example, the processing unit is configured, while in the idle mode of operation, to initiate a transition from the idle mode of operation to the standby mode of operation if no reception of the triggering message is detected. For example, if the communication device expects reception of messages at certain times, the communication device can be brought to the idle mode of operation for checking whether a message is actually received, and if yes, if the received message is a triggering message. If no transition to the active mode of operation has to be initiated, the communication device can return to the standby mode of operation, thereby saving power, and return to the idle mode of operation with the next expected message, for example.

In various implementations the communication device further comprises bootloader instructions, which for example are stored on the nonvolatile storage medium or on a further nonvolatile storage medium. Loading the first set of instructions into the volatile memory is performed using the bootloader instructions. For example, the bootloader instructions make sure that only the first set of instructions is loaded but not the second set of instructions, when entering the idle mode of operation. For example, additionally loading the second set of instructions into the volatile memory is performed without using the bootloader instructions. Instead, specific instructions in the first set of instructions are provided for this purpose, as mentioned above.

The improved operating concept may not be limited to the described three modes of operation but can include further stages of operating modes. For example, the communication device is further configured to selectively be operated in at least one further active mode of operation, in particular in addition to the other operating modes described above. In such a case the nonvolatile storage medium has further stored thereon at least one further set of instructions. The communication device is further configured to, during a transition from the active mode of operation to the at least one further active mode of operation, to additionally load the at least one further set of instructions into the volatile memory enabling the processing unit to execute instructions from the loaded first set of instructions, the loaded second set of instructions and the loaded at least one further set of instructions. The processing unit is configured, while in the active mode of operation, to initiate the transition from the active mode of operation to the at least one further active mode of operation in response to an activity event. Such activity events may include certain interrupt events or the like, without being limited to such example.

In the various implementations the communication unit may be configured for performing communication according to a mobile communication standard, for example one or more of 3GPP, LTE, LTE-advanced, LTE-advanced-pro, 4G, 5G, 5G New Radio, 5G Advanced, Wi-Fi, Bluetooth, Bluetooth Low Energy, Ultra-wideband, ZigBee, and the future generations of cellular standards already specified in 3GPP.

The improved operating concept also provides a method for operating a communication device that comprises a processing unit, a volatile memory, a non-volatile storage medium having stored thereon a first set of instructions and a second set of instructions, and a communication unit being coupled to the processing unit, wherein the communication device is configured to selectively be operated in a standby mode of operation, in an idle mode of operation and in an active mode of operation.

In an example implementation the method comprises, during a transition from the standby mode of operation to the idle mode of operation, loading the first set of instructions into the volatile memory enabling the processing unit to execute the loaded first set of instructions, and, during a transition from the idle mode of operation to the active mode of operation, additionally loading the second set of instructions into the volatile memory enabling the processing unit to execute instructions from the loaded first set of instructions and the loaded second set of instructions.

In the idle mode of operation, the processing unit interacts with the communication unit for detecting, using instructions from the first set of instructions, whether a triggering message is received via the communication unit, and initiates the transition from the idle mode of operation to the active mode of operation in response to the detection of the triggering message.

Further implementations of the method become readily apparent to the skilled reader from the various implementations described above in conjunction with the communication device.

The improved operating concept also provides a computer-implemented method for generating a computer program product with a first set of instructions and a second set of instructions stored together on a non-volatile storage medium for usage in the communication device according to one of the various implementations described above and/or in the operating method according to one of the various implementations described above.

In an example implementation the method comprises receiving code corresponding to a full set of instructions to be executed by the processing unit of the communication device. An idle scenario corresponding to the idle mode of operation of the communication device is run, using the code or instructions derived thereof. The method further comprises identifying idle portions of the code, which are executed during the idle scenario, and assigning instructions that correspond to the identified idle portions of the code to the first set of instructions. Instructions that do not correspond to the identified idle portions of the code are assigned at least partially to the second set of instructions. The first set of instructions and the second set of instructions are stored on the non-volatile storage medium. Hence the at least two set of instructions enable the communication device to be operated efficiently by loading and executing only those instructions that are needed in a specific situation.

In some implementations the full set of instructions is organized as a plurality of units. In such implementations identifying the idle portions of the code comprises identifying idle units of the plurality of units, which are executed during the idle scenario, and assigning the instructions that correspond to the identified idle portions of the code comprises assigning the identified idle units to the first set of instructions.

For example, such units are one of the following: functions, pages, segments, objects, modules, libraries, subroutines, applets. In other words, several possibilities for forming units to be distributed to the sets of instructions are available, e.g. depending on the type of code or programming language.

In some implementations identifying idle portions of the code comprises identifying transition portions of the code that are performed in connection with the transition from the idle mode of operation to the active mode of operation, and adding code, which is adapted for additionally loading the second set of instructions into the volatile memory, to the identified transition portions, e.g. as part of the identified idle portions. For example, the code for loading the second set of instructions may not be provisioned in the original code corresponding to the full set of instructions, which may be code not being optimized for the improved operating concept. Adding the code parts may increase efficiency of the resulting instruction sets.

For example, assigning the instructions is performed by a linker. A linker e.g. is a computer system program that takes one or more object files (e.g. generated by a compiler or an assembler) and combines them into a single executable file, library file, or another "object" file. The method may instruct the linker to perform the desired assignments.

In some implementations the method further comprises running an active scenario corresponding to the active mode of operation of the communication device using the code or instructions derived thereof, identifying active portions of the code, which are executed during the active scenario, and assigning instructions that correspond to the identified active portions of the code to the second set of instructions. This allows specifically determining which instructions belong to the second set of instructions. As an alternative, those instructions, which are not assigned to the first set of instructions, are assumed to belong to the second set of instructions.

Based on such implementations, the communication device may be further configured to selectively be operated in at least one further active mode of operation. The method then further comprises assigning instructions that do not correspond to the identified idle portions of the code and do not correspond to the identified active portions of the code at least partially to at least one further set of instructions, and storing the at least one further set of instructions on the non-volatile storage medium, further to the first set of instructions and the second set of instructions.

The computer-implemented method according to one of the implementations described may be provided as a computer program product that can be stored on a non-volatile storage medium, enabling a computer system with one or more processors to carry out the method.

BRIEF DESCRIPTION OF DRAWINGS

The improved operating concept will be explained in more detail in the following with the aid of the drawings.

Elements and functional blocks having the same or similar function bear the same reference numerals throughout the drawings. Hence their description is not necessarily repeated in following drawings.

In the drawings:

FIG. 1 shows a block diagram of an example implementation of a communication device;

FIG. 2 shows an example storage structure of a storage medium;

FIG. 3 shows an example flow diagram of a method for operating a communication device; and FIG. 4 shows an example flow diagram of a method for generating a computer program product.

DETAILED DESCRIPTION

Figure 1:
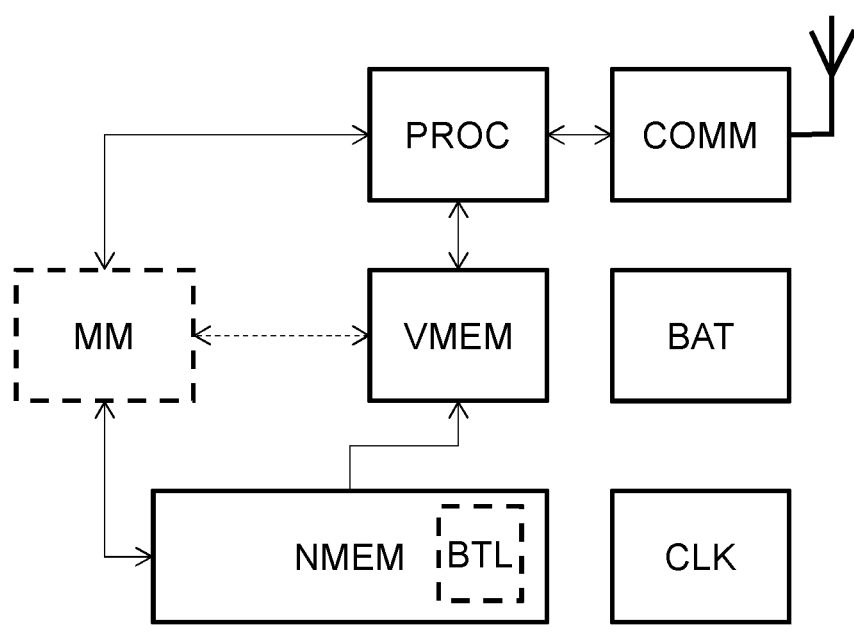

FIG. 1 shows a block diagram of an example implementation of a communication device according to the improved operating concept. The communication device comprises a processing unit PROC that is coupled to a volatile memory VMEM and to a non-volatile storage medium NMEM. The communication device optionally includes a memory manager MM that supports the processing unit PROC in accessing the non-volatile storage medium NMEM and/or the volatile memory VMEM. The communication device further includes a communication unit COMM being coupled to the processing unit PROC. The communication unit COMM is connected to an antenna for performing communication according to a mobile communication standard.

For example, the communication unit may COMM is configured for performing communication according to a mobile communication standard, for example one or more of 3GPP, LTE, LTE-advanced, LTE-advanced-pro, 4G, 5G, 5G New Radio, 5G Advanced, Wi-Fi, Bluetooth, Bluetooth Low Energy, Ultra-wideband, ZigBee, and the future generations of cellular standards already specified in 3GPP. Other communication standards should not be excluded by these examples.

The communication device further comprises a power supply BAT that may be implemented as a rechargeable or non-rechargeable battery, or an energy harvesting device like a solar panel or the like, or any other limited source of energy. For example, the power supply BAT is the only power supply of the communication device, but may include combinations of various limited sources of energy. The communication device may further comprise a timing circuit CLK for providing timing information to the various components of the communication device. The timing circuit CLK may include an RTC.

In some implementations the communication device may include a further non-volatile storage medium BTL, e.g. for storing boot loader instructions. The non-volatile storage medium BTL may be part of the non-volatile storage medium NMEM or may be provided as a separate memory unit.

Figure 2:
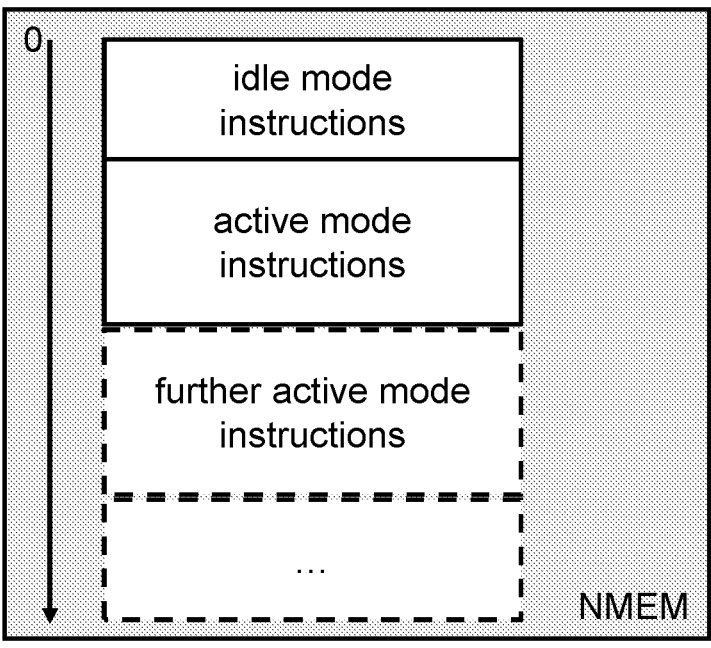

Referring now to FIG. 2, an example storage structure of a storage medium implementing the non-volatile storage medium NMEM is shown. The non-volatile storage medium NMEM has stored thereon a first set of instructions, namely idle mode instructions, and a second set of instructions, namely active mode instructions. In some configurations at least one further set of instructions may be stored on the non-volatile storage medium NMEM, like further active mode instructions or the like.

As can be seen from FIG. 2, the first set of instructions, respectively the idle mode instructions, are stored at the beginning of the storage medium NMEM, while the second set of instructions, respectively the active mode instructions, are stored, so to say, behind the first set of instructions. Similarly, the other sets of instructions may follow.

Referring back to FIG. 1, the communication device is configured to selectively be operated in a standby mode of operation, in an idle mode of operation and in an active mode of operation. The communication device is further configured, under certain conditions, to selectively load the first set of instructions into the volatile memory VMEM, which enables the processing unit PROC to execute the loaded first set of instructions, and additionally load the second set of instructions into the volatile memory VMEM, which enables the processing unit PROC to execute instructions from the loaded first set of instructions and the loaded second set of instructions. Similarly, if present, further sets of instructions, like the further active mode instructions shown in FIG. 2, may be loaded into the volatile memory VMEM for enabling the processing unit to execute also these instructions when needed.

Figure 3:
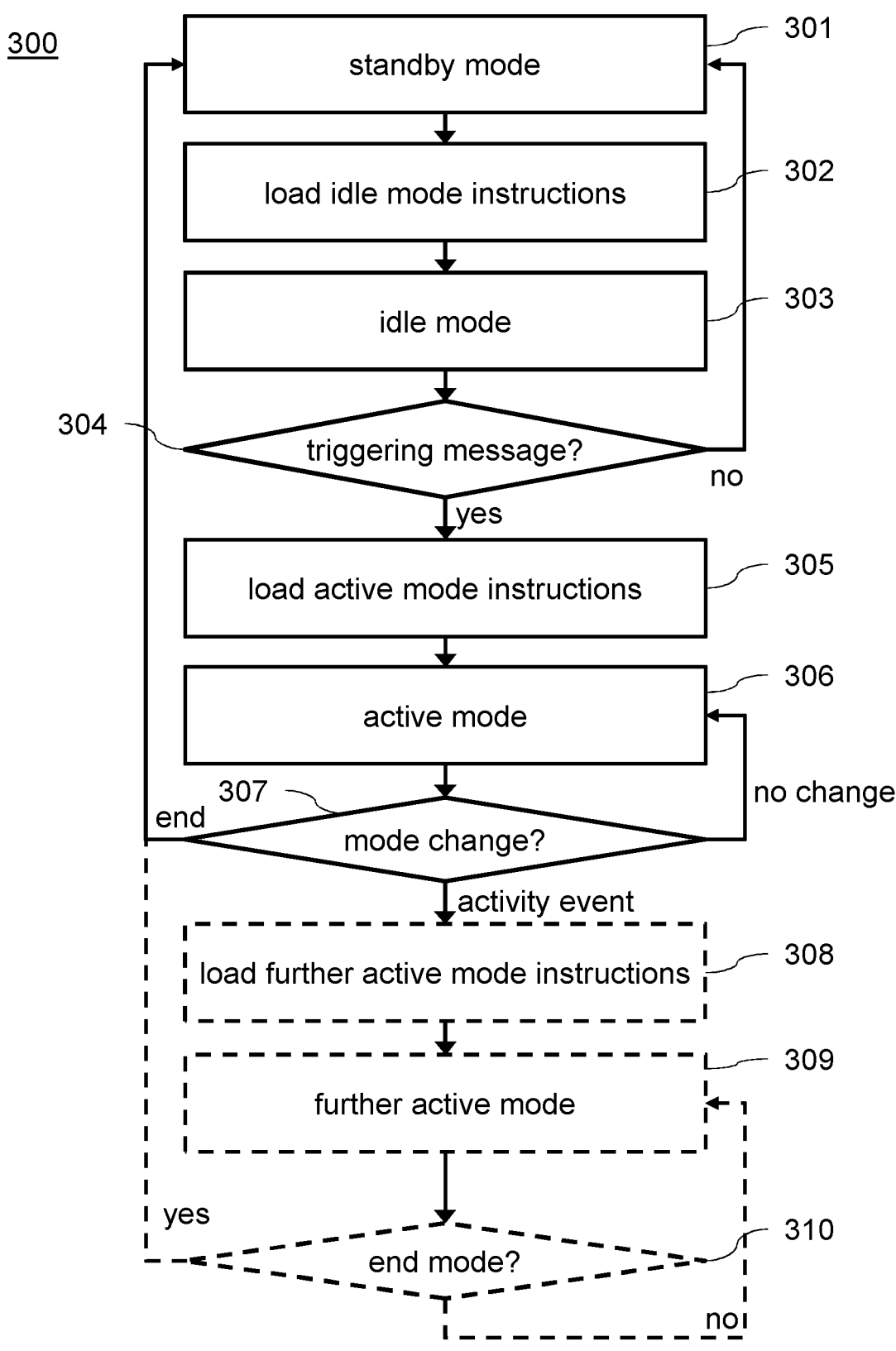

Referring now to FIG. 3, an example flow diagram of a method for operating such a communication device is shown. The method 300, for example, starts in the standby mode 301, during which the communication device is in a state of little or even minimum power consumption, particularly compared to the other operating modes like idle mode and active mode. For example, the processing unit PROC is halted in the standby mode 301, and the volatile memory VMEM may be unpowered such that it can be regarded as empty.

During a transition from the standby mode 301 to the idle mode 303 in step 302 a first set of instructions corresponding to idle mode instructions is loaded from the non-volatile storage medium NMEM into the volatile memory VMEM, which can also be called a working memory of the processing unit PROC. This enables the processing unit PROC to execute instructions from the loaded first set of instructions during the idle mode 303.

For example, in the idle mode 303 the processing unit PROC interacts with the communication unit COMM for detecting, using instructions from the first set of instructions, respectively idle mode instructions, whether a triggering message is received via the communication unit COMM in decision block 304. If no triggering message is detected, the communication unit may return to the standby mode 301. If, however, a triggering message is detected in decision block 304, a transition from the idle mode of operation 303 to the active mode of operation 306 may be initiated, thereby additionally loading the second set of instructions, respectively the active mode instructions into the volatile memory VMEM in step 305. This enables the processing unit PROC to execute instructions from both the loaded first set of instructions and the loaded second set of instructions. For example, the transition from the idle mode of operation 303 to the active mode of operation 306 is performed using further instructions from the first set of instructions.

For example, the instructions for loading the second set of instructions are included in the first set of instructions.

Hence in the idle mode 303 the processing unit PROC may check, using instructions from the first set of instructions, via the communication unit COMM, whether some kind of message received via the communication unit COMM fulfils the conditions of a triggering message. For example, the communication device enters the idle mode of operation from the standby mode of operation based on a schedule, e.g. a predetermined schedule that may be controlled by the timing circuit CLK. Hence checking for the triggering message may be performed based on a schedule.

If, for example, a received message indicates that there is some kind of network activity, such a message may be regarded as a triggering message that lets the communication device enter the active mode of operation 306. While instructions of the first set of instructions only allow the triggering message to be detected, the additional instructions from the second set of instructions allow further actions to be performed, like analysis of the content of the triggering message or other subsequent messages to be received or sent via the communication unit COMM. For example, the second set of instructions includes instructions for some kind of network stack that allows active communication over the communication unit. Additionally, further components of the communication device like sensors or actors may be addressed or controlled only with instruction from the second set of instructions. Hence if none of these operations is necessary in a specific situation, loading the corresponding instructions can be omitted with the improved operating concept such that only the basic instructions, i.e. the idle mode instructions, are loaded. This omission of loading the second set of instructions saves power compared to loading the full set of instructions.

Loading the idle mode instructions in step 302 may be performed using boot loader instructions that are stored on the non-volatile storage medium NMEM or on the further non-volatile storage medium BTL. If boot loader instructions are available, additionally loading the second set of instructions into the volatile memory VMEM in step 305 may be performed without using the boot loader instructions.

When in the active mode of operation 306, the processing unit PROC can regularly check in decision block 307 whether a change of this active mode is to be performed. As long as no change is recognized, the communication device can remain in, respectively return to, the active mode of operation 306. If an end condition is detected, it can return to the standby mode of operation 301 for saving power.

As indicated in FIG. 2, the non-volatile storage medium NMEM may have further stored thereon at least one further set of instructions, like the further active mode instructions. In such a case, referring back to FIG. 3, during the active mode of operation it may be detected in decision block 307 that an activity event is present. In such a case the communication device may enter a further active mode of operation 309, wherein during the transition from the active mode 306 to the further active mode 309 the further active mode instructions are loaded into the volatile memory VMEM in block 308, enabling the processing unit PROC to execute instructions from the loaded first set of instructions, the loaded second set of instructions and the loaded at least one further set of instructions. This allows further stages with operations, respectively instructions, to be introduced that are only needed in some specific cases. For example, network operation, which is used more regularly, could be part of the active mode of operation, while sensor operation may only be part of the further active mode of operation, to give a non-limiting example.

In decision block 310 it is checked whether the further active mode of operation 309 is to be ended. If yes, it can be returned to the standby mode of operation 301. If no, the processing unit PROC remains in the further active mode of operation 309.

Figure 4:
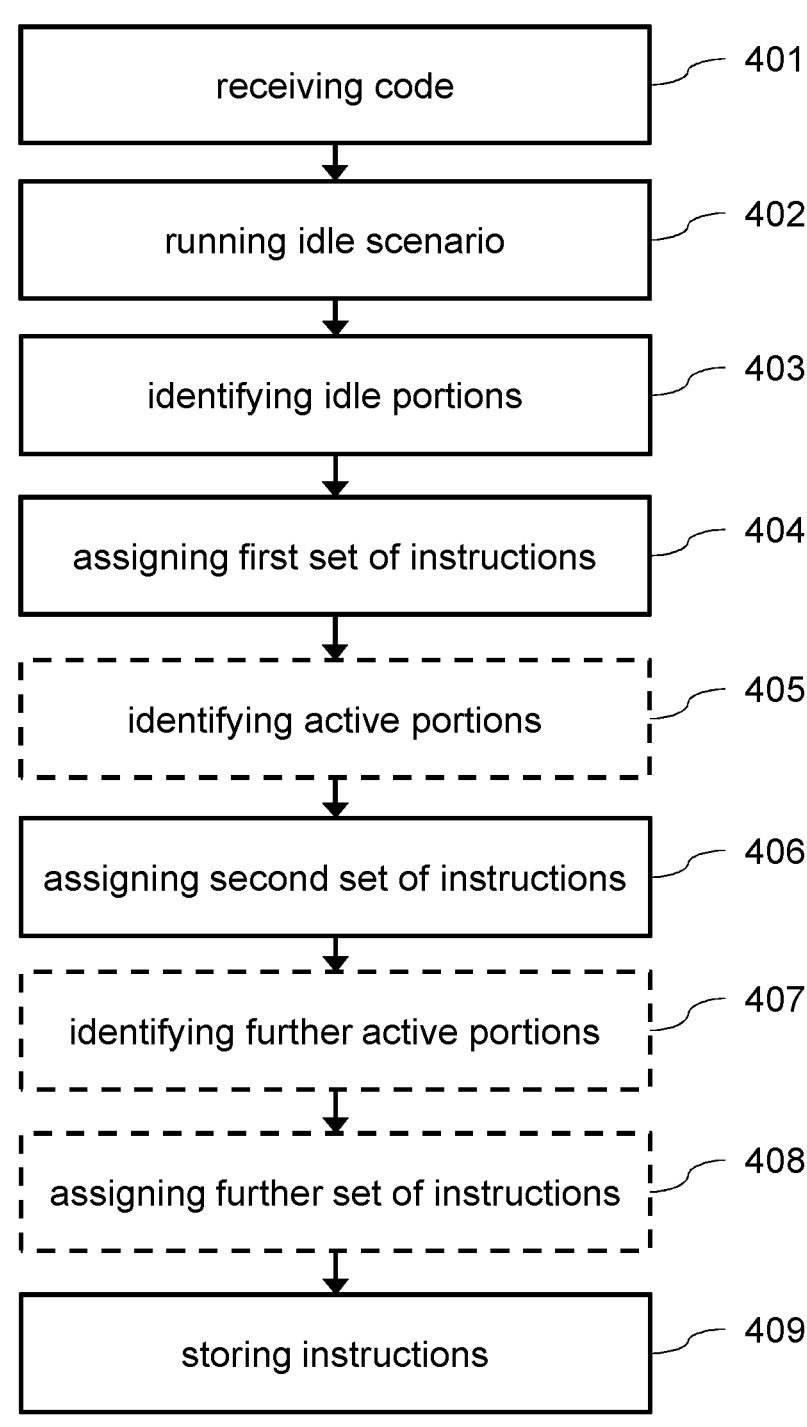

It should be apparent from the above disclosure that the separation into the first set of instructions, the second set of instructions and optionally in further sets of instructions for operating the communication device is a key element of the improved operating concept. Accordingly, in the following there will be described, particularly in conjunction with FIG. 4, a computer-implemented method 400 for generating a computer program product with such a first set of instructions and such a second set of instructions stored together on a non-volatile storage medium, e.g. storage medium NMEM, for usage in a communication device like the device of FIG. 1.

In the method 400 at step 401 code corresponding to a full set of instructions to be executed by the processing unit PROC of the communication device is received. Such code may be source code, byte code, binary code or any other type of code that is used during software development. For example, such code could be the code that is used, without the following adaptations, in a conventional communication device.

In step 402 an idle scenario is run corresponding to the idle mode of operation of the communication device using the code or instructions derived thereof. For example, functions, respectively operations, to be performed during the idle mode of operation of the communication device are executed. For example, the execution is performed within an integrated development environment, IDE, e.g. simulating the operation of the communication device in the idle mode of operation. In addition or as an alternative, the code or the instructions derived thereof could be actually transferred to the communication device such that the corresponding instructions are actually executed by the communication device respectively its processing unit PROC. In some implementations the execution may be distributed between the IDE and the communication device.

In step 403 idle portions of the code, which are executed during the idle scenario, are identified. For making the identification in step 403 easier, the code corresponding to the full set of instructions may be organized as a plurality of units including, but not limited to, functions, pages, segments, objects, modules, libraries, subroutines or applets. Such organization into units can be called an instrumentation of all function calls of the code. The organization into units further allows to produce a log or trace of what has been executed, i.e. which units have been executed, particularly for the later analysis in step 403 for identifying the idle portions. For example, identifying the idle portions 403 of the code comprises identifying idle units of the plurality of units, which are executed during the idle scenario. This may be performed using, for example, the log or trace of what has been executed.

In step 404 the instructions that correspond to the identified idle portions of the code are assigned to a first set of instructions. This may include assigning the identified idle units to the first set of instructions. For example, the instructions of the first set of instructions are placed at the beginning of the non-volatile storage medium such that they can be easily loaded first when transitioning from the standby mode of operation to the idle mode of operation.

In optional step 405 active portions of the code are optionally identified. This may include running an active scenario corresponding to the active mode of operation of the communication device. Similarly, to that described above for the idle portions, by using a log or trace of function calls or units etc., those portions or units that are executed during the active mode of operation can be identified.

Based on such identification, in step 406 the corresponding active portions of the code, respectively instructions that correspond to the identified active portions of the code, are assigned to the second set of instructions. If, however, step 405 specifically identifying the active portions is omitted, the remaining portions, respectively instructions of the code, which are not assigned to the first set of instructions, are simply assigned to the second set of instructions. The assignment of the instructions, for example, is performed by a linker, which may be part of the IDE. For example, the respective code units are tagged or marked such that the linker can interpret these tags or marks as instructions to place the respective code portions or units into the corresponding set of instructions.

As described above in conjunction with the operation of the communication device, further operation modes, e.g. active operation modes, can be provided for the communication device with separate sets of instructions. For example, several levels of active modes of operation may be assigned to different activities of the communication device, like simple network activity, enhanced network activity, sensor/actor operation or the like.

A simple network activity may correspond to the detection of a simple network page, e.g. detecting a type of message or the like, but without for example loading a TCP/IP stack for full internet connectivity, which would only be necessary in the enhanced network activity.

Similar to that described in conjunction with steps 403 and 405, in optional step 407 further active portions of the code may be identified for assigning the corresponding instructions to a further set of instructions in optional step 408. The identification of the further active portions may be limited to identify those portions or units that are not identified as idle portions or active portions, or by actively identifying those portions that are executed during a corresponding further active scenario.

Finally in step 409 the various sets of instructions are stored to the non-volatile storage medium NMEM, such that a first set of instructions is stored in the beginning, followed by the second set of instructions and, optionally, by the one or more further set of instructions. This storage step 409 includes storing the instructions in the described way onto an intermediate storage medium, e.g. of the IDE, respectively the computer running the IDE, and later transferring the instructions in the prescribed way to the non-volatile storage medium of the communication device.

In some implementations step 403 of identifying the idle portions of the code comprises identifying transition portions of the code that are performed in connection with the transition from the idle mode of operation to the active mode of operation. In this course, this includes adding code, which is adapted for additionally loading the second set of instructions into the volatile memory VMEM of the communication device, to the identified transition portions, e.g. as part of the identified idle portions. Hence it can be ensured that code is available for the processing unit PROC during the idle mode of operation for loading the second set of instructions, if the triggering message is detected.

In some implementations boot loader instructions may be further provided that enable the processing unit to load only the first set of instructions when transitioning from the standby mode of operation to the idle mode of operation.

In summary, the improved operating concept allows, at a transition from the standby mode of operation to the idle mode of operation, e.g. at boot time, those functions to be loaded that are necessary for the idle mode of operation, i.e. the first set of instructions, and if the communication device needs to jump to another scenario or operating mode, to load more of the code, i.e. the second or further set of instructions, at runtime. Hence, the binary section containing the first set of instructions is loaded from the non-volatile storage medium NMEM into the volatile memory VMEM, e.g. RAM, first of all, which is quicker than loading the whole set of instructions. However, it is not only quicker, but it requires less energy to perform the load operation, ensuring a power efficient operation of the communication device. If the communication device stays in the idle mode of operation and "nothing happens", it can go back to the standby mode of operation, e.g. by turning the communication device more or less off, depending on the actual hardware of the communication device.

In some configurations the timing circuit CLK, e.g. an RTC, may wake up the communication device, i.e. initiates the transition to the idle mode of operation. In many applications entering the idle mode of operation and detecting that there is no triggering message, i.e. nothing happened, is the usual scenario with a probability of more than 90%, more than 95%, more than 99% or even more than 99.9% such that in these usual scenarios the communication device can save lots of energy that would be wasted when loading the second and further sets of instruction without using them. If the communication device detects activity, i.e. detects a triggering message, the respective set(s) of instructions is/are loaded, such that energy is only spent for loading and executing these instructions in the exceptional cases.

Various embodiments of the improved operating concept can be implemented in the form of logic in software or hardware or a combination of both. The logic may be stored in a computer readable or machine-readable storage medium as a set of instructions adapted to direct one or more processors of a (distributed) computer system to perform a set of steps disclosed in embodiments of the improved calibration concept. The logic may form part of a computer program product adapted to direct an information-processing device to automatically perform a set of steps disclosed in embodiments of the improved calibration concept.

The specification and drawings are, accordingly, to be regarded in an illustrative rather than a restrictive sense. However, it will be evident that various modifications and changes may be made thereunto without departing from the scope of the invention as set forth in the claims.

LIST OF REFERENCE SIGNS

PROC processing unit
VMEM volatile memory
NMEM non-volatile storage medium
COMM communication unit
BTL non-volatile storage medium
CLK timing circuit
BAT power supply
MM memory manager
300, 400 method
301-310 method steps
401-409 method steps

The invention claimed is:

1. A communication device comprising:
a processing unit (PROC);
a volatile memory (VMEM);
a non-volatile storage medium (NMEM) having stored thereon a first set of instructions and a second set of instructions; and
a communication unit (COMM) being coupled to the PROC;
wherein the communication device is configured
to selectively be operated in a standby mode of operation, in an idle mode of operation and in an active mode of operation;

during a transition from the standby mode of operation to the idle mode of operation, to load the first set of instructions into the VMEM enabling the PROC to execute the loaded first set of instructions;
during a transition from the idle mode of operation to the active mode of operation, to additionally load the second set of instructions into the VMEM enabling the PROC to execute instructions from the loaded first set of instructions and the loaded second set of instructions;
wherein the PROC is configured, in the idle mode of operation, to interact with the COMM for detecting, using instructions from the first set of instructions, whether a triggering message is received via the COMM, and to initiate the transition from the idle mode of operation to the active mode of operation in response to the detection of the triggering message.

2. The communication device according to claim 1, wherein the transition from the standby mode of operation to the idle mode of operation is initiated based on a schedule.

3. The communication device according to claim 1, wherein the transition from the idle mode of operation to the active mode of operation is performed using further instructions from the first set of instructions.

4. The communication device according to claim 1, wherein the PROC is configured, while in the idle mode of operation, to initiate a transition from the idle mode of operation to the standby mode of operation if no reception of the triggering message is detected.

5. The communication device according to claim 1, further comprising bootloader instructions stored on the NMEM or on a further non-volatile storage medium (BTL), wherein loading the first set of instructions into the VMEM is performed using the bootloader instructions.

6. The communication device according to claim 5, wherein additionally loading the second set of instructions into the VMEM is performed without using the bootloader instructions.

7. The communication device according to claim 1, wherein
the NMEM has further stored thereon at least one further set of instructions;
the communication device is further configured to
selectively be operated in at least one further active mode of operation; and
during a transition from the active mode of operation to the at least one further active mode of operation, to additionally load the at least one further set of instructions into the VMEM enabling the PROC to execute instructions from the loaded first set of instructions, the loaded second set of instructions and the loaded at least one further set of instructions; and
the processing unit is configured, while in the active mode of operation, to initiate the transition from the active mode of operation to the at least one further active mode of operation in response to an activity event.

8. The communication device according to claim 1, wherein the COMM is configured for performing communication according to a mobile communication standard including at least one of 3GPP, LTE, LTE-advanced, LTE-advanced-pro, 4G, 5G, 5G New Radio, 5G Advanced, Wi-Fi, Bluetooth, Bluetooth Low Energy, Ultra-wideband, ZigBee.

9. A method for operating a communication device that comprises a processing unit (PROC), a volatile memory (VMEM), a non-volatile storage medium (NMEM) having stored thereon a first set of instructions and a second set of instructions, and a communication unit (COMM) being coupled to the PROC, wherein the communication device is configured to selectively be operated in a standby mode of operation, in an idle mode of operation and in an active mode of operation, the method comprising:

during a transition from the standby mode of operation to the idle mode of operation, loading the first set of instructions into the VMEM enabling the PROC to execute the loaded first set of instructions;

during a transition from the idle mode of operation to the active mode of operation, additionally loading the second set of instructions into the VMEM enabling the PROC to execute instructions from the loaded first set of instructions and the loaded second set of instructions;

wherein, in the idle mode of operation, the PROC interacts with the COMM for detecting, using instructions from the first set of instructions, whether a triggering message is received via COMM, and initiates the transition from the idle mode of operation to the active mode of operation in response to the detection of the triggering message.

10. A computer-implemented method for generating a computer program product with a first set of instructions and a second set of instructions stored together on a non-volatile storage medium (NMEM) for usage in the communication device according to claim 1, the method comprising:

receiving code corresponding to a full set of instructions to be executed by the processing unit (PROC) of the communication device;

running an idle scenario corresponding to the idle mode of operation of the communication device using the code or instructions derived thereof;

identifying idle portions of the code, which are executed during the idle scenario;

assigning instructions that correspond to the identified idle portions of the code to the first set of instructions;

assigning instructions that do not correspond to the identified idle portions of the code at least partially to the second set of instructions; and storing the first set of instructions and the second set of instructions on the non-volatile storage medium (NMEM).

11. The method according to claim 10, wherein the full set of instructions is organized as a plurality of units;

identifying the idle portions of the code comprises identifying idle units of the plurality of units, which are executed during the idle scenario; and assigning the instructions that correspond to the identified idle portions of the code comprises assigning the identified idle units to the first set of instructions.

12. The method according to claim 11, wherein the units are one of the following: functions, pages, segments, objects, modules, libraries, subroutines, applets.

13. The method according to claim 10, wherein identifying idle portions of the code comprises identifying transition portions of the code that are performed in connection with the transition from the idle mode of operation to the active mode of operation; and adding code, which is adapted for additionally loading the second set of instructions into the VMEM, to the identified transition portions.

14. The method according to claim 10, wherein assigning the instructions is performed by a linker.

15. The method according to claim 10, further comprising:

running an active scenario corresponding to the active mode of operation of the communication device using the code or instructions derived thereof;

identifying active portions of the code, which are executed during the active scenario; and assigning instructions that correspond to the identified active portions of the code to the second set of instructions.

16. The method according to claim 15, wherein the communication device is further configured to selectively be operated in at least one further active mode of operation, the method further comprising:

assigning instructions that do not correspond to the identified idle portions of the code and do not correspond to the identified active portions of the code at least partially to at least one further set of instructions; and storing the at least one further set of instructions on the NMEM, further to the first set of instructions and the second set of instructions.

* * * * *